Figure 1:
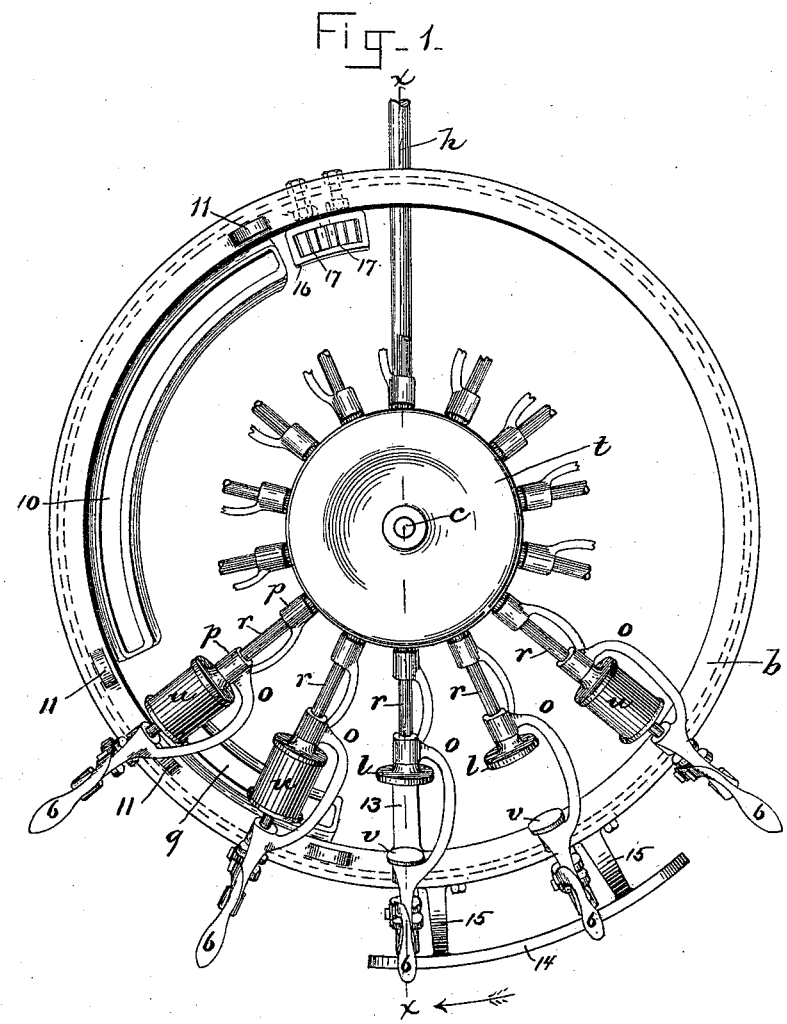

(No Model.) 4 Sheets—Sheet 1.

W. H. GILBERT.
CAN SOLDERING MACHINE.

No. 417,720. Patented Dec. 24, 1889.

WITNESSES:
A. D. Harrison.
W. C. Ramsay.

INVENTOR:
W. H. Gilbert

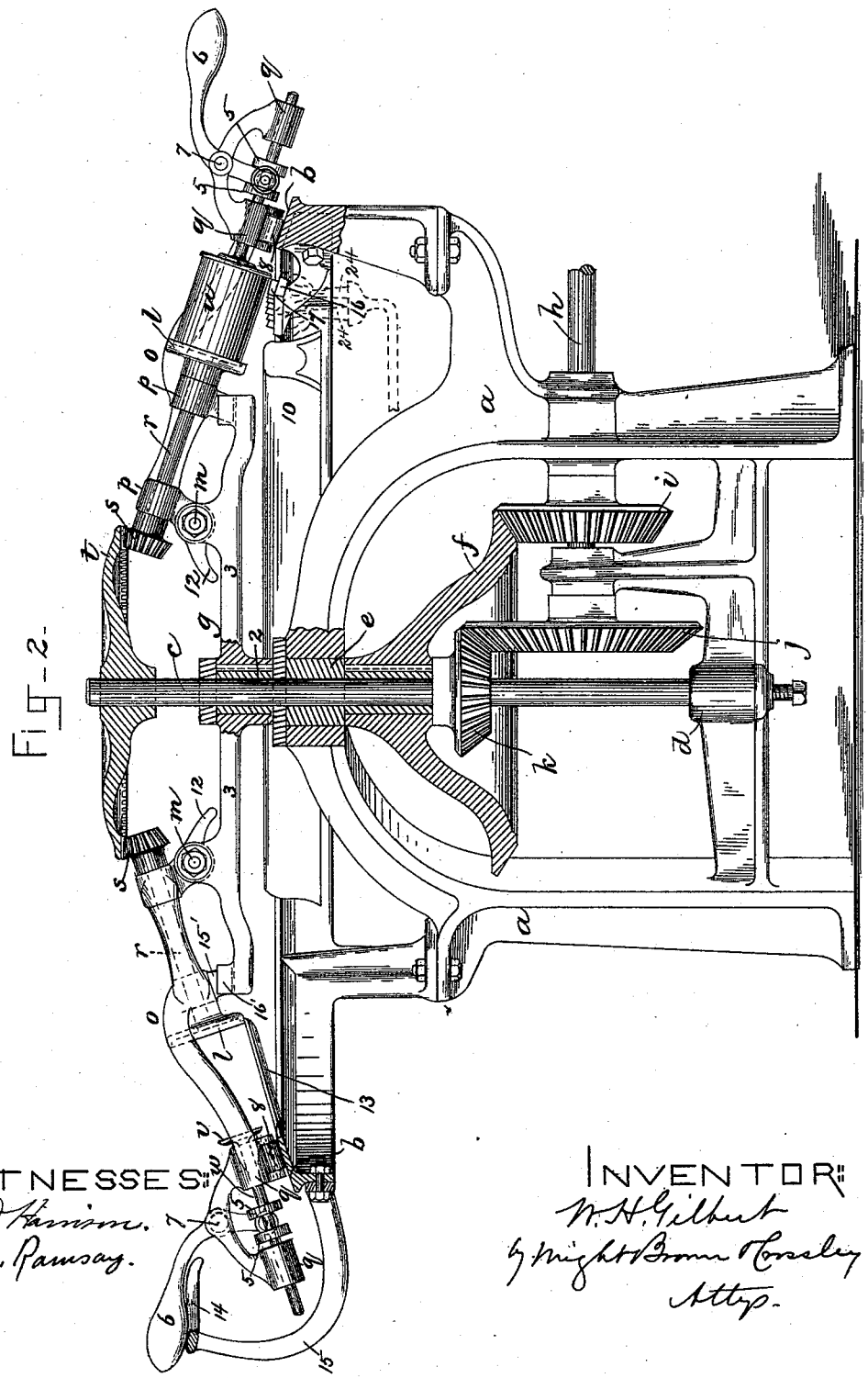

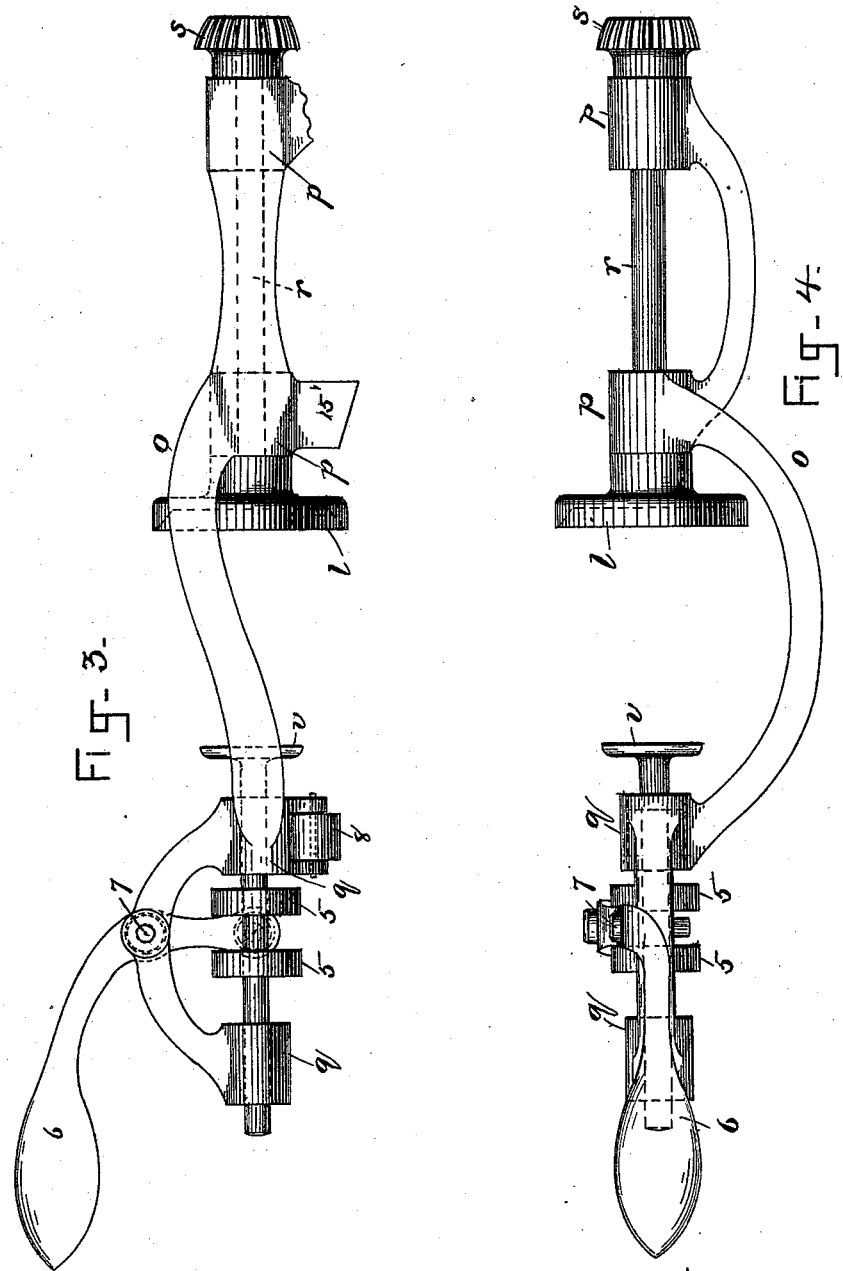

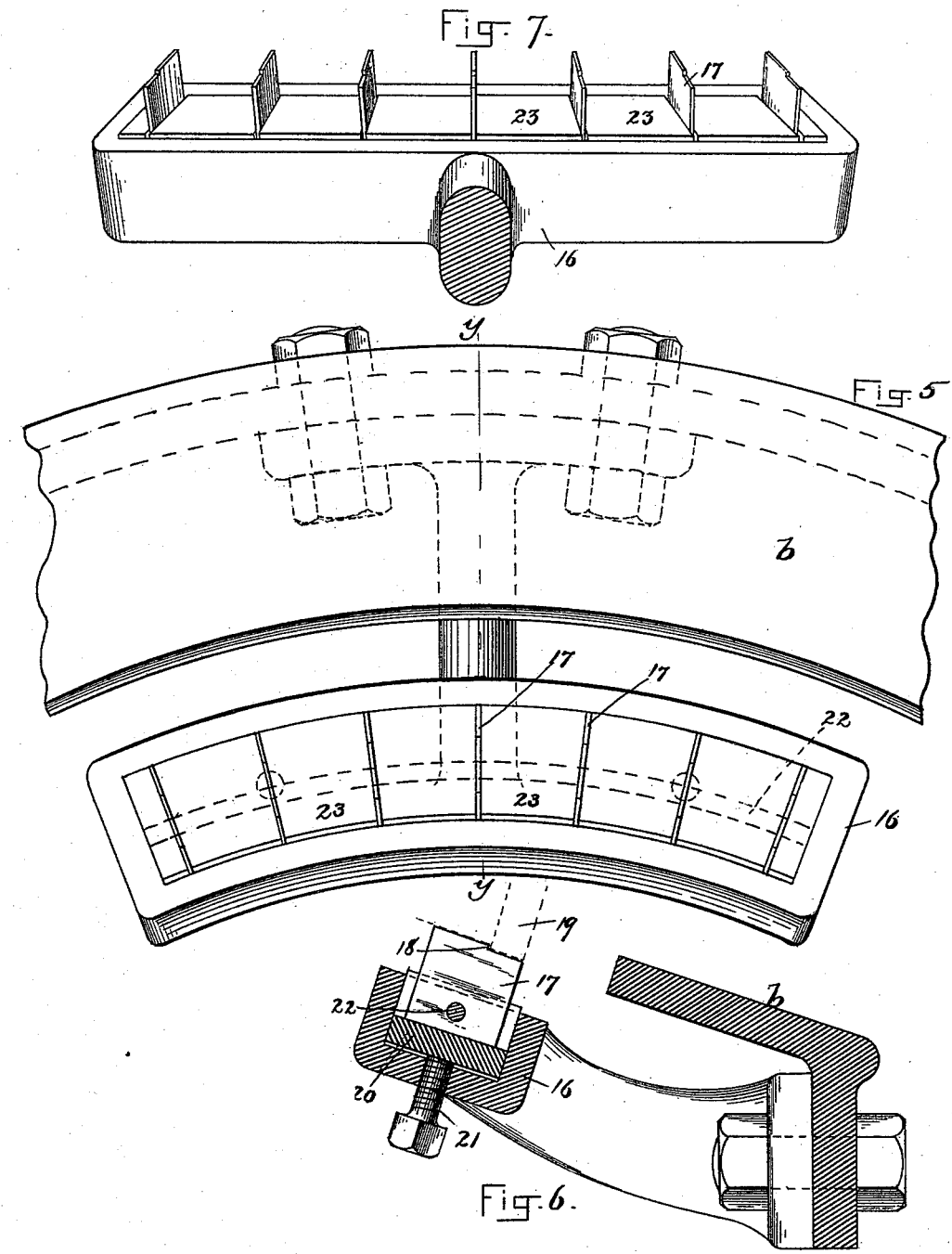

UNITED STATES PATENT OFFICE.

WILLIAM H. GILBERT, OF BALTIMORE, MARYLAND, ASSIGNOR OF ONE-FOURTH TO E. B. WELCH, OF CAMBRIDGE, MASSACHUSETTS.

CAN-SOLDERING MACHINE.

SPECIFICATION forming part of Letters Patent No. 417,720, dated December 24, 1889.

Application filed February 20, 1889. Serial No. 300,581. (No model.)

*To all whom it may concern:*

Be it known that I, WILLIAM H. GILBERT, of Baltimore, in the State of Maryland, have invented certain new and useful Improvements in Can-Soldering Machines, of which the following is a specification.

This invention relates to machines for securing flanged heads to can-bodies by solder and to that class of machines in which the can-bodies with the heads thereon are secured to a series of radiating shafts journaled in a rotating frame, the shafts being at the same time rotated, so that each can has a planetary motion produced by the rotation of the shaft to which it is secured and by the rotation of the shaft-carrying frame. The described movements of the cans cause them to roll successively through tanks of flux and solder, supported in such relation to the rotating frame or carrier that the outer end of each can is presented to said tanks and is prepared for soldering by the flux-tank and coated with solder by the solder-tank.

The invention has for its object, first, to provide improved means for giving the described movements to the cans and their carrier; secondly, to provide improved means for securing the cans to the shafts which rotate them; and, thirdly, to provide means for scraping the surplus solder from the cans and at the same time rubbing and smoothing the solder-joints.

To these ends my invention consists in the improvements which I will now proceed to describe and claim.

Of the accompanying drawings, forming a part of this specification, Figure 1 represents a top view of a machine embodying my improvements, portions of the mechanism being omitted for the sake of clearness. Fig. 2 represents a section on line $x\,x$ of Fig. 1. Figs. 3 and 4 represent, respectively, side and top views of one of the can-rotating shafts and the means for clamping a can thereto. Fig. 5 represents a top view of a part of the machine, showing the scraping attachment. Fig. 6 represents a section on line $y\,y$ of Fig. 5. Fig. 7 represents a perspective view of the scraping attachment.

The same letters and figures of reference indicate the same parts in all the drawings.

In the drawings, $a$ represents the supporting-frame, to which is suitably attached a circular track $b$, having its tread-surface beveled or inclined downwardly from the center of the circle formed by said track.

$c$ represents a vertical shaft located at the center of the machine and journaled in bearings $d\,e$, the former $d$ being in a part of the frame $a$, while the latter $e$ is a sleeve attached to the hub of a gear-wheel $f$, hereinafter described, said sleeve or bearing $e$ being journaled in a bearing formed for it in the upper portion of the frame $a$.

$g$ represents a carrier or spider composed of a hub 2, attached to and rotating with the sleeve $e$, and arms 3 formed on and radiating from said hub, the latter being fitted to rotate independently on the shaft $c$. To the arms 3 are pivoted at $m\,m$ the inner ends of yokes or arms $o$, each of which is provided with bearings $p\,p$ and $q\,q$.

$r\,r$ represent a series of shafts journaled in the bearings $p$ and provided at their inner ends with bevel-pinions $s$, which engage a bevel-gear $t$, attached to the upper end of the shaft $c$.

To the outer ends of the shaft $r$ are attached circular heads or supports $l$, against which the ends of cans $u$ are held by means of clamping heads or disks $v$, attached to rods $w$, which are adapted to rotate and move endwise in the bearings $q\,q$. Said rods are provided with collars 5 5, separated by a space into which project studs attached to the shorter arms of levers 6, which are pivoted at 7 to the yokes $o$. The longer arms of said levers 6 are weighted, and are so arranged that they exert a pressure by gravitation through the shorter arms on the collars 5 on the rods $w$, and thereby press the heads $v$ of said rods toward the heads $l$ on the shafts $r$, so that a can interposed between the heads $v$ and $l$ will be clamped by said heads with sufficient firmness to enable the rotation of the shafts $r$ to rotate the cans, the rods $w$ and heads $v$ rotating with the cans. The outer portions of the yokes $o$ are provided with rollers 8, which run on the circular track $b$ when the carrier $g$ is rotated. Motion is imparted simultaneously to the shaft $c$ and carrier $g$, but at different rates, through a shaft $h$, having a bevel-gear $i$, meshing with the gear $f$, which is connected with the carrier $g$, and a larger bevel-gear $j$, meshing with a gear or pinion $k$, attached to the shaft $c$. The proportions of said gears are such that the shaft $c$ is rotated more rapidly than the carrier $g$. The shafts $r$, their supporting-yokes, and the clamping devices carried by the latter are therefore caused to move progressively in a circular path on the frame of the machine, and the shafts $r$ are at the same time rotated, and are thus caused to rotate the cans while they are moving progressively.

9 10 represent segmental tanks attached to the track $b$ and located at the inner side of the same at such height that the outer ends of the cans held and rotated as described will enter the upper portions of said tanks successively. The tank 9 contains a suitable acid or flux, and the tank 10 contains melted solder. The tanks are arranged so that the cans first enter the flux-tank and then the solder-tank, each can being therefore first coated with flux and then with solder along the seam formed by the application of the head to the can-body.

The track $b$ is provided with a series of cams or protuberances 11, arranged to raise each of the yokes $o$ just before it enters and just before it leaves each tank, thus enabling the cans to pass over the ends of the tanks without striking the same. The pivotal connection of the inner ends of the yokes $o$ with the carrier $g$ permits the described rising and falling of the outer ends of the yokes, their upward motion being preferably limited by lugs or projections 12 on the yokes, arranged to strike the carrier $g$ and prevent a sufficient displacement of the yokes to separate the pinions $s$ from the gear $t$.

The cans are supplied to the machine through a chute (not shown) arranged to drop one can at a time, so that it will fall on an inclined rest 13, attached to the track $b$, said rest being arranged to support a can $u$ between a head $l$ and clamping-disk $v$. At the moment when the can is dropped on said support the clamping-disk is drawn back by the action of a curved or cam-shaped rail 14, which is attached by arms or brackets 15 to the track $b$, and is formed to raise a weighted lever 6, as shown in Fig. 2, and thus draw back the clamping-disk $v$, engaged with said lever, before the yoke $o$, carrying said lever, reaches the support or rest 13, and to release said lever and to allow it to force the clamping-disk forward and clamp the inserted can just after the latter is deposited. It should be here remarked also that the rail 14 raises the clamping-lever at a point sufficiently removed from the rest 13 to release the soldered can and enable the latter to drop from the clamping devices of the yoke $o$, which carried it while it was being soldered, before said yoke reaches the rest 13, thus making room for the insertion between the clamping-devices of said yoke of the newly-supplied blank.

16 represents a holder or bracket attached to the track $b$ and provided with a series of upwardly-projecting blades or scrapers 17, which are arranged to act on the soldered surfaces of the cans and scrape therefrom the surplus solder and at the same time rub down and sweat the soldered seam or joint. Said scrapers are provided with shoulders 18, which fit the edge of the flange of a can-head 19, as shown in dotted lines in Fig. 6. The scrapers are kept hot by any suitable means, as by gas-burners 24, suitably arranged, and they are arranged in close proximity to the solder-tank, so that they remove the surplus solder before it has time to congeal, and by their own heat prevent the solder from adhering to their sides, the surplus solder dropping from the edges and sides of the scrapers and being collected by any suitable means. The yokes $o$ are steadied laterally by lugs 15' formed thereon and entering slots between ears 16' on the carrier $g$. The solder-tank may be heated by any suitable means.

The scraping-blades 17 are preferably made of steel and are secured in the holder 16 by any suitable means. In Fig. 6 they are shown as resting on a follower 20 in said holder, said follower being adjustable by means of screws 21 to compensate for wear of the edges of the blades. A wire rod 22 is passed through holes in the blades, and blocks 23 are placed between the blades on said rod to keep the blades in place laterally.

I claim—

1. In a can-soldering machine, the combination, with a carrier $g$, of a series of yokes $o$, attached to said carrier and having bearings, a series of inclined radial shafts $r$, journaled in said bearings and provided at their inner ends, which are highest, with pinions $s$, can-clamping devices co-operating with said shafts, a shaft $c$, having the gear $t$, meshing with said pinions, a system of gearing for rotating said shaft $c$ and gear $t$, and an independent system of gearing for rotating said carrier at a speed different from that of said shaft and gear, substantially as set forth.

2. In a can-soldering machine, the combination, with the track $b$, having the cams or protuberances 11, and the segmental flux and solder-tanks, the ends of which are adjacent to said cams or protuberances, of the rotary carrier $g$, the yokes $o$, pivoted thereto and provided with the stopping projections 12, the inclined radial shafts $r$, having pinions $s$ at their inner ends, the rotary gear meshing with said pinions, and can-clamping devices co-operating with said shafts, substantially as set forth.

3. In a can-soldering machine, the combination, with the circular track $b$, of the rotary carrier $g$, the yokes $o$, attached to said carrier and provided with the rollers 8, running on said track, the inclined radial shafts $r$, having pinions $s$ at their inner ends, the rotary gear $t$, meshing with said pinions, and can-clamping devices co-operating with said shafts, substantially as set forth.

4. In a can-soldering machine, the combination, with the rotary carrier $g$, the yokes $o$, attached thereto, and the inclined radial shafts $r$, journaled in said yokes and having pinions $s$ at their inner ends and the heads $l$ at their outer ends, of the endwise-movable rotary rods $w$, also journaled in said yokes and provided with collars 5, the weighted levers 6, pivoted to said yokes and engaging said collars, a rotary gear $t$, meshing with said pinions, and means for rotating said carrier $g$ and gear $t$ at different speeds, substantially as set forth.

5. In a can-soldering machine, the combination, with the rotary carrier $g$, the yokes $o$, attached thereto, and the inclined radial shafts $r$, journaled in said yokes and having pinions $s$ at their inner ends and the heads $l$ at their outer ends, of the endwise-movable rotary rods $w$, also journaled in said yokes and provided with collars 5, the levers 6, pivoted to said yokes and having short arms engaging said collars and longer outwardly-extending arms, the cam-track 14, to lift said weighted arms when a can is to be released, the rotary gear $t$, meshing with said pinions, and means for rotating said carrier and gear at different speeds, substantially as set forth.

6. In a can-soldering machine, the combination, with progressively moving and rotating can-clamping devices, of a solder-tank and scraper over which said devices travel and a burner arranged adjacent to said scraper to heat the same, substantially as set forth.

7. The improved scraping attachment for can-soldering machines, consisting of a series of blades 17 and a holder in which said blades are adjustably secured, substantially as set forth.

8. The improved scraping attachment for can-soldering machines of the class herein described, composed of a series of blades 17, each having a shoulder 18 and a holder in which said blades are adjustably secured, as set forth.

In testimony whereof I have signed my name to this specification, in the presence of two subscribing witnesses, this 18th day of February, A. D. 1889.

WM. H. GILBERT.

Witnesses:
 W. H. H. RALEIGH,
 WM. A. WRIGHT.